(12) United States Patent
Sandner et al.

(10) Patent No.: US 7,847,997 B2
(45) Date of Patent: Dec. 7, 2010

(54) PROJECTION APPARATUS FOR SCANNINGLY PROJECTION

(75) Inventors: Thilo Sandner, Dresden (DE); Harald Schenk, Dresden (DE); Michael Scholles, Dresden (DE); Markus Schwarzenberg, Dresden (DE); Alexander Wolter, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 226 days.

(21) Appl. No.: 12/038,112

(22) Filed: Feb. 27, 2008

(65) Prior Publication Data

US 2008/0218835 A1 Sep. 11, 2008

(30) Foreign Application Priority Data

Mar. 8, 2007 (DE) ........................ 10 2007 011 425

(51) Int. Cl.
*G02B 26/00* (2006.01)
(52) U.S. Cl. ................. 359/239; 359/201.2; 359/204.2; 359/242
(58) Field of Classification Search .................. 359/239
See application file for complete search history.

(56) References Cited

U.S. PATENT DOCUMENTS

| | | | | |
|---|---|---|---|---|
| 3,984,187 A | * | 10/1976 | Bestenreiner et al. | ......... 355/80 |
| 6,262,781 B1 | | 7/2001 | Deter | |
| 6,577,429 B1 | * | 6/2003 | Kurtz et al. | ................. 359/279 |
| 6,843,568 B2 | | 1/2005 | Schenk et al. | |
| 6,945,652 B2 | * | 9/2005 | Sakata et al. | .................. 353/30 |
| 2006/0158756 A1 | * | 7/2006 | Hay | .......................... 359/858 |
| 2008/0024483 A1 | * | 1/2008 | Ishii et al. | ................... 345/214 |

FOREIGN PATENT DOCUMENTS

| | | |
|---|---|---|
| DE | 10245104 A1 | 4/2004 |
| EP | 0704138 B1 | 8/2001 |
| WO | 98/20475 A1 | 5/1998 |
| WO | 2006/063577 A1 | 6/2006 |

* cited by examiner

*Primary Examiner*—Jessica T Stultz
(74) *Attorney, Agent, or Firm*—Keating & Bennett, LLP

(57) ABSTRACT

A projection apparatus for scanningly projecting an image onto an image field by means of a radiation beam includes a modulator for modulating an intensity of the radiation beam such that the intensity of the radiation beam changes in a time interval during which a scan point to which the radiation beam is directed sweeps a pixel of the image field.

21 Claims, 5 Drawing Sheets

(4a)

(4b)

(4c)

(4d)

PROJECTION APPARATUS FOR SCANNINGLY PROJECTION

CROSS-REFERENCE TO RELATED APPLICATIONS

This application claims priority from German Patent Application No. 102007011425.9, which was filed on Mar. 8, 2007, and is incorporated herein in its entirety by reference.

TECHNICAL FIELD

The present invention relates to a projection apparatus and particularly to a gray scale modulation method for projection lasers.

BACKGROUND

For the projection of images, either parallel methods, as it is the case for example with LCDs (liquid crystal displays) or with micro-mirror arrays, or scanning methods are used, as they are for example realized by a biaxially movable or two uniaxially movable mirrors. Disadvantageously, in the parallel methods, a comparably large substrate area in manufacturing and also a complex test procedure are necessary. Both result in a comparably high price for parallel-type projectors, so that methods working in parallel are not considered for a low-cost projection apparatus.

In the scanning methods, the projectors include one or two movable mirrors enabling deflection of a light beam about two deflection axes and two-dimensional deflection of the light beam, respectively. By the deflection, the light point generated by the light beam is moved on the image field, the intensity of the light beam meanwhile being modulated on the image field and being dependent on the instantaneous projection place of the light point on the image field.

Thus, representation of the desired image content is such that a light source is modulated corresponding to the image point data of the image to be represented. The modulation here for example is via a change in the amplitude, wherein an amplitude value of the light beam is adapted corresponding to the brightness of the point to be represented. So as to achieve as many gray scales as possible, the laser should be capable of being modulated continuously or in a more or less stepless manner in its amplitude.

Projection systems can be realized inexpensively and with little spatial need if a microscanner-mirror-based laser system is used, for example. One example for such a laser system is described in U.S. Pat. No. 6,843,568. Here, light emitted from one or more laser sources is deflected by means of a micromirror swinging about two axes and projected onto a projection area or image field.

One main parameter of scanning projection systems is the scan method used. The most important scan methods are linear scan and resonant scan, with intermediate forms also being possible, but seldom used. Since the scan method can be chosen separately for both axes about which the emitted light is deflected, scanning projection systems can be divided into three groups:
1. Systems with linear scan for both projection coordinates
2. Systems with linear scan for one and resonant scan for the other projection coordinate
3. Systems with resonant scan for both projection coordinates.

In systems with linear scan, the projection is based on a column- and line-like representation of the image. So as to allow for this column- and line-like representation, in these systems, the line frequency, i.e. the frequency of the deflection of the light beam and/or light point in horizontal direction, is large as opposed to the column frequency, i.e. the frequency of the deflection of the light beam along the vertical direction. This ratio of these frequencies with respect to each other determines the number of resolvable lines and can only be increased by a so-called interlace method, in which at first all even lines and then all odd lines of an image are scanned and/or represented alternatingly.

In micromechanically manufactured scanning projectors or scanners, the achieving of low eigenfrequencies or resonance frequencies poses a fundamental problem, since the mechanical stability of the system decreases with the eigenfrequency. If the vertical deflection is to be excited in resonance or resonantly, the deflection mirror or the deflection mirrors thus have to be operated at a correspondingly even greater horizontal frequency. Alternatively, the vertical deflection has to be performed in the quasi-static operation, in order to be able to resonantly create a horizontal deflection. In the case of a resonant vertical row deflection of the light beam, a problem is that the horizontal column frequency has to be great relative to an anyway great resonant row frequency. The great horizontal deflection frequencies occurring therein induce dynamic deformation of the mirror plate, which leads to resolution problems in the projection. In the case of the quasi-static vertical row deflection, very high operating powers are necessary that make miniaturization of the control of the deflection unit or the mirrors impossible or the deflection unit very expensive. These problems also cannot be eliminated by a decrease of both frequencies, since the row frequency or the vertical frequency determines the image repetition frequency, and a too low image repetition frequency leads to a flickering of the image.

FIG. 6 shows a schematic illustration for a linear scan. The projection area on which the image is represented is in the xy plane, for example, and is limited by a right edge 40a, a left edge 40b, a lower edge 40c and an upper edge 40d. A light beam and/or a laser 41, for example, starts at a starting point A in the upper right image corner, and the projection of the image takes places by movement of the light beam 41 by means of the pattern represented. The light beam thus moves at first from the right image edge 40a to the left image edge 40b, with only movement along the x coordinates taking place, then the light beam 41 moves to a next line, i.e. it moves back to the right image edge 40a, but with the y value being changed such that the light beam 41 appears in a following line of the image to be represented. From the right image edge 40a, the light beam again moves in parallel to the lower image edge 40c towards the left image edge 40b. The pattern continues correspondingly until the light beam 41 has represented the entire image line by line, and an end point A has been reached.

In a linear scan, the deflection of the light beam or the laser 41 in the respective projection direction is in time-linear manner. With this, all image points with equal time period are projected. This allows for especially simple readout of the image projection data and uncomplicated modulation independent of the position of the respective image point. At the same time, however, high demands are placed on the deflection system with respect to its linearity. This means that the light beam 41 moves exactly along the row line (i.e. in parallel to the x direction) and moves along the lines at a speed as constant as possible, so that the light beam reaches the left image edge 40b at fixedly prescribed time instants. The control of the deflection unit necessitates, as shown in FIG. 6, a sawtooth or triangular signal, i.e. a signal containing many harmonics. As already explained in detail, the frequency with which the mirror deflects the light beam along the x direction strongly differs from the frequency with which the mirror deflects the light beam 41 along the y direction, and are given by the number of represented lines of the image or the repetition frequency of the image in one second. Usually, these frequencies are default externally and are not dependent on corresponding resonance frequencies for the deflections of the mirror in the two directions of the xy plane. The control of the mechanical system thus is against the resonance behavior, which means a relatively high energetic effort.

In the resonance scan, the deflection of the laser 41 takes places according to a sine function, wherein the frequency may for example be adapted to the resonance behavior of the mirror. Since the laser 41 in this case does not move across the projection area at constant speed, the projection durations of the image points hence are position dependent. In systems with resonant scan for both projection coordinates, the coverage of all image points may for example also be achieved by the realization of a Lissajous figure with high repetition time. Great repetition times here mean a great least common multiple for the coordinate projection frequencies. In this method, however, the readout of the image projection data is made complicated.

The non-uniform pixel modulation times, which for example are a result of differently long projection durations of the image points depending on the position, necessitate adaptation of the (laser) modulation explained in greater detail in the following. As already described, in a resonance scan, it is advantageous to perform the control of the system by means of pure sine signals. Except for the fact that, spectrally speaking, pure sine signals are ideal, the mechanical resonance properties of the deflection systems may thereby be utilized to achieve energetic optimization.

The modulation in a double-resonant scan may for example take place as follows. In the projection of an image constructed of a rectangular pixel raster by means of a laser, the laser source is operated at constant power during the entire sweep of the area of a pixel (=time duration $T_{pixel}$), so that the energy $E_{pixel}$ (amount of light) of the image point to be represented is radiated integrally over this time period. Since the brightness of the image point may vary continuously, it also is desirable to modulate the laser power in analog or very fine manner.

FIG. 5 shows an example for a conventional amplitude modulation. An image having 16 pixels is illustrated on the left-hand side. Except for a pixel A and a pixel B, all further pixels are white. The pixel A has a lighter gray scale, and the pixel B a darker gray scale. The laser beam 41 reaches the pixel A at a first time instant $T_1$ and sweeps the pixel A until a second time instant $T_2$. The pixel B is swept in a time period between the second time instant $T_2$ and a third time instant $T_3$. Depending on the speed of the laser beam 41 and depending on the pixel size, the sweep time duration or the dwelling duration $T_{pixel}$ of the laser beam 41 for the respective pixel may vary.

The right-hand side of FIG. 5 shows how the power of the laser $i_{laser}$ is varied correspondingly, in order to represent the image of the left-hand side in FIG. 5. Until the first time instant $T_1$, the laser radiates at a constant maximum power $i_{max}$, which corresponds to the white pixels. At the first time instant $T_1$, at which the laser beam 41 reaches the pixel A, the power of the laser is reduced from the value $i_{max}$ to a value $i_1$. Between the first time instant $T_1$ and the second time instant $T_2$, while the laser sweeps the pixel A, the laser constantly radiates at the first intensity $i_1$. At the second time instant $T_2$, the laser beam reaches the pixel B, and the power of the laser beam is reduced from $i_1$ to a further value $i_2$. The second intensity $i_2$ of the laser again remains constant until a third time instant $T_3$, at which the laser beam leaves the pixel B.

Since it is assumed here that the time instants $T_1$, $T_2$ and $T_3$ are at the same or almost the same distance to each other and since the second intensity $i_2$ is lower than the first intensity $i_1$, the corresponding pixel B is darker than the pixel A. From the third time instant $T_3$ onward, the laser again radiates at the maximum power $i_{max}$, so that the following pixel again corresponds to a white image point. The brightness with which an image point or a pixel appears on an image field corresponds to the amount of light or energy the laser transfers during the sweep time duration $T_{pixel}$ and can be calculated as follows:

Laser modulation: $T_{pixel} \cdot i_{laser} = E_{pixel}$, wherein $i_{laser}$ is constant in the interval $[T_1, T_2]$ and $T_{pixel} = T_2 - T_1 = T_3 - T_2$ is assumed.

Hence, in conventional laser projection systems, the brightness modulation only is via gray scales of the laser. So as to be able to project a realistic image, the amplitude of the laser (and hence the radiation intensity) should be regulatable in analog or very fine manner. However, this often cannot be realized technologically, or only with great effort. In particular, a technical problem arises because the sweep time duration $T_{pixel}$ may lie in the range of only few nanoseconds, depending on resolution. This necessitates the use of lasers capable of being amplitude-modulated in quasi-stepless manner, having a modulation frequency of several 100 MHz.

SUMMARY

According to an embodiment, a projection apparatus for scanningly projecting an image onto an image field by means of a radiation beam may have: a modulator for modulating an intensity of the radiation beam such that the intensity of the radiation beam changes from a first value to a second value within a time interval during which a scan point to which the radiation beam is directed sweeps a pixel of the image field, and is turned on for a duration of a turn-on interval dependent on a brightness of the pixel of the image field.

According to another embodiment, a method for scanningly projecting an image onto an image field by means of a radiation beam may have the steps of: modulating an intensity of the radiation beam such that an intensity of the radiation beam is changed from a first value to a second value within a time interval during which the radiation beam sweeps a pixel of the image field, and remains turned on for a duration of a turn-on interval dependent on a brightness of the pixel of the image field.

The present invention is based on the finding that a projection apparatus for scanningly projecting an image to an image field by means of a radiation beam or light beam can be obtained, in spite of coarseness of the light intensity control, by the fact that a means for modulating changes intensity of the light beam such that the intensity of the light beam changes in a time interval $T_{pixel}$, during which a scanning point, to which the radiation beam 18 is directed, sweeps a pixel of the image field (22). During the time interval, the intensity of the light beam may change for example binarily, (in step-wise manner) with respect to several level steps, or also continuously.

A laser may be employed for generating the light beam. But other radiation sources are also possible. The brightness modulation, however, does not only take place via gray scales of the laser, but for example includes the fact that the laser, during the sweep of the area of the pixel in the time duration $T_{pixel}$, is not scanned permanently, but only binarily, with adaptation of the impulse duration and/or the duty cycle. For the exemplary binary scan, in which the laser has two states, an on-state and an off-state, the impulse duration advantageously is chosen so that the product $t_{ON} \cdot i$ corresponds to the pixel energy $E_{pixel}$ to be scanned, wherein $t_{ON}$ corresponds to the time duration during which the laser is in the on-state.

In a binarily modulated laser, it is only differentiated between two states or light intensity levels, namely zero and $i_{max,pixel}$, so that a brightness adaptation only is adjusted over a time duration in which the laser is in the on-state. Advantageously, the on-state is arranged in the middle of the time interval $T_{pixel}$. The brightness of the image point thus results from the formula:

$$\text{Laser modulation: } t_{on,pixel} \cdot i_{max} = E_{pixel}$$

Using a mathematic formulation, the present invention describes a projection apparatus in which a temporal derivative of the intensity of the light beam has a maximum and such that the maximum lies inside the time interval $T_{pixel}$. The maxima in the temporal derivative correspond to a reversal point in the intensity, and the intensity of the light beam as a function in time has at least two reversal points in the time interval $T_{pixel}$ in embodiments, so that a maximum of the intensity is between the two reversal points. Advantageously, at both edges of the time interval $T_{pixel}$, there are local minima of the intensity. Furthermore, an amount of light transferred during the time interval advantageously is adjusted such that the amount of light corresponds to the brightness of the image point to be represented.

In further embodiments of the present invention, the projection apparatus comprises a deflection apparatus with for example two mirrors, so that the light beam can be deflected in both directions of the image field. As mentioned, the light beam for example is a laser beam radiated from a laser system and projected as image on the image field via the exemplary deflection apparatus. As laser system, for example, a pulsed laser may be used, so that the intensity and hence the brightness of the image point may be adjusted with the number of the impulses transferred in the time interval $T_{pixel}$.

In further embodiments, a binarily modulated light source will be combined with amplitude modulation, so that not only two states (on/off), but also a slower and steadily rising intensity of the light beam can be realized. In this combination of the inventive method with a multi-state brightness modulation, the laser is modulated, during sweeping of a pixel with temporally variable intensity, so that energy to be radiated off the image point advantageously is reached integrally. This condition is expressed by the following formula:

$$\text{Laser modulation} \cdot \int_{1 \cdot T_{pixel}} i_{laser}(t) dt = E_{pixel}$$

By means of this variant, the system can be optimized with respect to the demand on maximum laser modulation frequency and necessary laser gray scale number. The brightness modulation of the laser may for example take place by a known amplitude modulation.

In further embodiments, further laser modulation curves, which are realized by means of the combination method, are achieved. This for example includes control with non-constant, temporally freely varying amplitude within the pixel and/or within the time interval $T_{pixel}$. Another example for such a combination is control with time-discretely step-wise varying amplitude within the pixel.

In further embodiments, what is implemented is not only an exemplary laser system, which works in a certain wavelength and hence color, but a combination of systems working with various colors. With three laser systems in the three basis colors, for example, multi-color images can be projected, so that each laser system projects a partial image each with the corresponding color to the image field at the same time. But several systems of the same color and/or equal wavelength may also be superimposed to thereby achieve increased image repetition frequency, for example.

In the binary modulation, the intensity of the laser is changed in two steps. But multi-step modulations are also possible, e.g. a three- or four-step change of the intensity.

As compared with conventional technology, the inventive projection apparatus or the inventive method are advantageous in that a binarily modulatable laser having a correspondingly high modulation frequency may be used. Pulsed lasers, which are available with very high pulse frequencies, may also be used.

BRIEF DESCRIPTION OF THE DRAWINGS

Embodiments of the present invention will be detailed subsequently referring to the appended drawings, in which.

DETAILED DESCRIPTION

Figure 1:
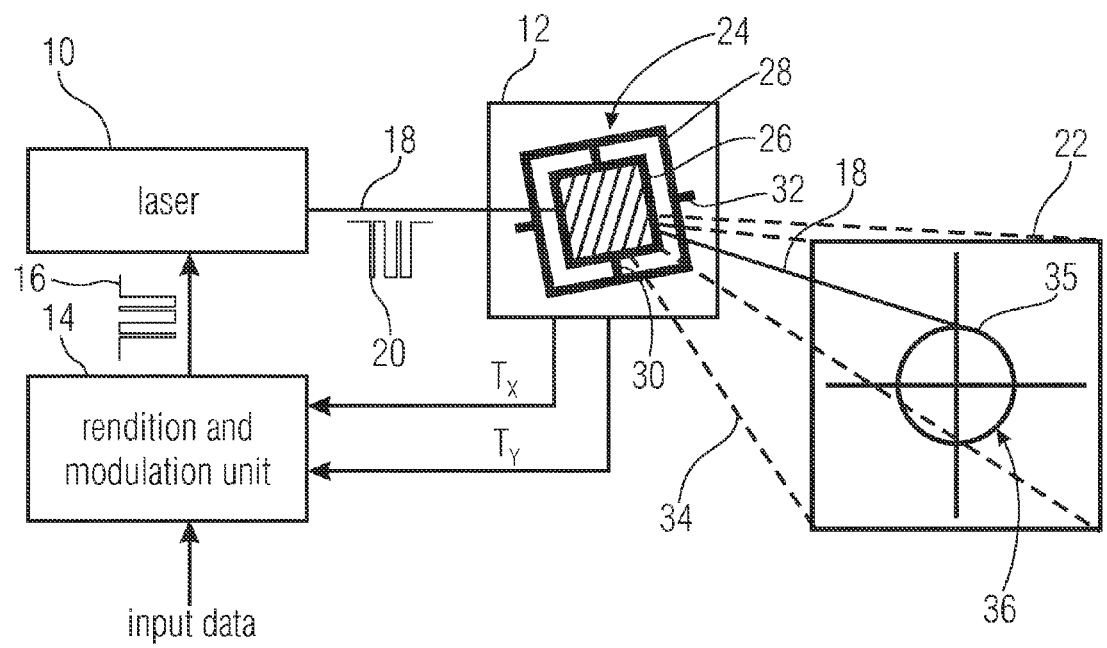
FIG. 1 is a schematic illustration of a projection apparatus according to an embodiment of the present invention.

Before explaining embodiments of the present invention in greater detail on the basis of the drawings in the following, it is pointed out that the same or similar elements in the figures are provided with the same or similar reference numerals, and that repeated description of these elements is omitted.

With reference to FIG. 1, the construction of a projection apparatus according to one embodiment of the present invention is described first. It is pointed out that for better understanding the illustration of FIG. 1 is not embodied to scale. Furthermore, FIG. 1 is related to the projection apparatus for the monochrome representation of an image, although the present invention is also applicable to projection apparatuses providing the colored representation of an image.

The projection apparatus of claim 1 includes a laser 10, a deflection means 12 and a rendition and modulation unit 14. The rendition and modulation unit 14 receives at an input image data representing the image to be projected and is connected to a control input of the laser 10 via an output, in order to send the digital control signal 16 thereto, by which the intensity of a laser beam 18 sent out from the laser 10 is modulated, as it is schematically illustrated by an intensity profile 20 corresponding to the profile of the control signal 16. The laser beam 18 is deflected to or in the direction of an image field 22 by the deflection means 12, the deflection means enabling two-dimensional deflection of the light beam 18. The deflected laser beam is indicated with 18'.

In the present embodiment, the deflection means 12 includes a micromechanically manufactured, biaxially suspended mirror 24, wherein alternatively two micromechanically manufactured, uniaxially suspended mirrors could however also be used. The biaxially suspended mirror 24 consists of a rectangular mirror plate 26 as well as a rectangular frame 28. In order to enable the biaxial suspension and thus a rotation of the mirror plate 26 about two axes, the rectangular mirror plate 26 is suspended or journaled in a centered manner at the frame 28 via a first deflection axis 30. Perpendicularly to the first deflection axis 30, the frame 28 is journaled in a centered manner at a second deflection axis 32 being perpendicular to the first deflection axis 30. At the suspensions along the two deflection axes 30 and 32, the biaxially suspended mirror experiences return forces at deflections about the axes 30 or 32 about a rest position, because of which it has eigenfrequencies or resonance frequencies with reference to the two axes 30 and 32.

The deflection means 12 further includes a control (not shown), in order to vibrate the biaxially suspended mirror 24 about the deflection axes 30 and 32, whereby the light beam 18 is deflected about the first deflection axis at a first deflection frequency $f_1$ and about the second deflection axis 32 at a second deflection frequency $f_2$. Both deflection frequencies $f_1$ and $f_2$ are adjusted to frequencies in the vicinity of their eigenfrequencies and differ only slightly. Moreover, the deflection frequencies $f_1$ and $f_2$ are adjusted such that they have a fractioned rational ratio. The maximum deflections or the reversal points of the vibrations about the two deflection axes 30 and 32 define a solid angle segment 34 within which the deflected beam 18' moves and that spans the image field 22. Due to the deflection frequencies, a light point 35 created by the deflected laser beam describes a Lissajous figure, as it is described in the following.

The deflection means 12 is connected to two further inputs of the rendition and modulation unit via two outputs, in order to send trigger signals Tx and Ty thereto that indicate when the vibration about the first or the second deflection axis 30 or 32, respectively, is at its upper or lower reversal point. As it is described in the following, the trigger signals Tx and Ty serve for the synchronization of the rendition and modulation unit 14 with the deflection means 12.

The deflection of the light beam 18 together with the modulation of the intensity of the light beam 18, as it is described in the following, yields an image 36 within the image field 22, wherein in FIG. 1 a cross with a circle whose center lies in the cross point of the cross is shown only exemplarily as image.

After the construction of the projection apparatus of FIG. 1 has been described previously, the functioning thereof or the projection method it is based on is described in the following.

In the following, first the deflection of the laser beam 18 is explained, as it is conducted by the deflection means 12. As it has been previously described, the biaxially suspended mirror 24 is vibrated about the deflection axes 32 and 30 at deflection frequencies f1 and f2, respectively, that are equal or about equal to resonance frequencies of the mirror 24 with respect to the deflection axes 30 and 32. In other words, the biaxially suspended mirror 24 is operated on or in the vicinity of its resonance frequencies. The two resonance frequencies $f_1$ and $f_2$ advantageously only differ slightly, e.g. by less than an order. In the case of a high quality of the resonators of the biaxially suspended mirror 24, the connection between the time on the one hand and the two deflection angles of the light beam 18' on the other may be described in very good approximation by a sinusoidal function. In order to keep the deflection frequencies $f_1$ and $f_2$ of the biaxially suspended mirror 24 constant, for example a reference voltage signal is fed to the control of the deflection means 22 from the rendition and modulation unit 14, whose progress in time corresponds to the target progress of the deflection angle of at least one of the two vibrations about the deflection axes 30 and 32.

In addition, the two deflection frequencies $f_1$ and $f_2$ are adjusted such that they have a greatest common divisor. The greatest common divisor corresponds to the image repetition rate $f_r$, i.e. the rate with which the light point 34 created by the light beam 18' reaches the same position again on the image field 22 after a fixed default course. In the present case, since the two vibration or deflection axes 30 and 32 are perpendicular to each other, and for the case that the frequency ratio of the two deflection frequencies $f_1$ and $f_2$ is $f_1:f_2=n:m$, wherein n and m are integers (i.e. n,m∈N) and indicate the smallest common divisors, the following applies for the image repetition rate $f_r$:

$$f_r = f_1/n = f_2/m.$$

Figure 2:
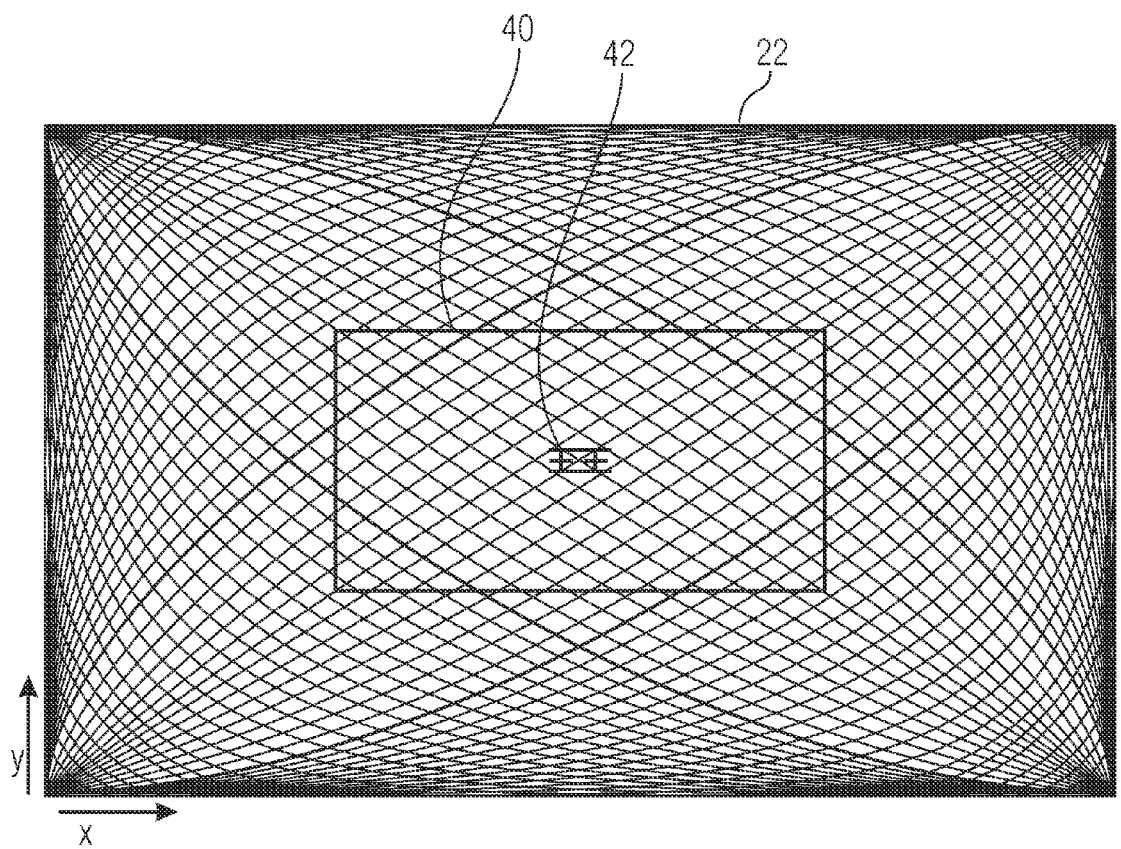
FIG. 2 shows a predetermined course the light beam of the projection apparatus of FIG. 1 describes on the image field if the ratio of the two deflection frequencies is 50:51.
Figure 3:
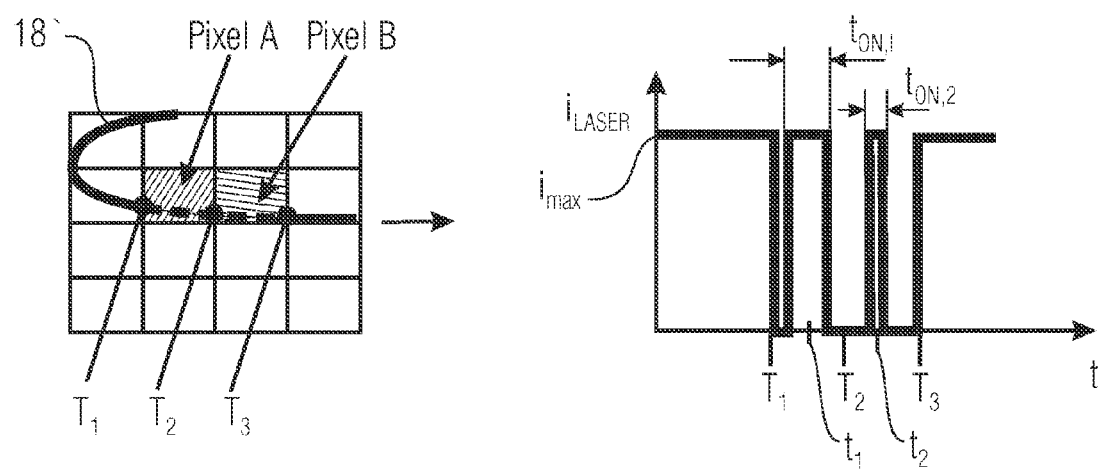
FIG. 3 shows a binary modulation of the light beam according to a further embodiment.

The light point created by the deflected light beam 18' using the deflection frequencies $f_1$ and $f_2$ substantially follows a Lissajous figure on the image field 22, as it is shown in FIGS. 2 and 3 for special frequency ratios. The deflected light beam 18' is deflected by the deflection means 12 such that the light beam 18' repeatedly scans the course of the Lissajous figure at the image repetition rate $f_r$.

FIG. 2 shows the Lissajous figure the light beam 18' describes on the image field 22 for the case that the frequency ratio is $f_1:f_2=50:51$, while FIG. 3 illustrates the Lissajous figure for the frequency ratio $f_1:f_2=70:71$. In both figures it is assumed that the deflection axes 30 and 32 are aligned such that they are parallel to the image field 32 and that the rotation of the mirror plate 26 about the deflection axis 30 causes movement of the light point 35 created by the deflected light beam 18' along the horizontal axis x, while the deflection of the biaxially suspended mirror 24 about the deflection axis 32 causes movement of the light point 35 along the vertical axis y. Correspondingly, the vibration about the deflection axis 30 is at a reversal point if the light point is at the left or right margin of the image field 22, and the vibration about the deflection axis 32 is at a reversal point if the light point is at an upper or lower margin of the image field 22.

If one associates each intersection of the Lissajous figure with an image point, i.e. a point on the image field at which a light point 35 with desired brightness is to be created by modulation of the light beam 18, in order to result in the image to be projected together with other image points, and counts each reversal point as half an intersection, the following applies for the number N of the image points defined in this way:

$$N = n \times m$$

According to this definition of the image points, the number of the image points in the case of FIG. 2 is 50×51 (=2550).

In the case of FIG. 2, an image repetition rate of 50 Hz may be accomplished if the horizontal frequency $f_1$ is 2500 Hz and the vertical frequency $f_2$ 2550 Hz.

As can be seen from the above equation for the number of intersection or image points N, the coverage of the image field depends on the chosen frequency ratio between the two deflection frequencies $f_1$ and $f_2$. As can be further seen from the two FIGS. 2 and 3, the image point density or the intersection point density of the Lissajous figure in the margin area of the image field 22 is greater than in the inner area. For the homogenization of the image point density, if necessary, the margin area of the image field 22 may be faded out, such as by switching off the light source 10 in this outer area. In FIG. 2 a window is exemplarily shown at 40, outside of which the laser 10 may be switched off.

Each point along the Lissajous figure may serve as image point of the image field 22 by a modulation of the intensity of the light beam 18. Deviating from the previous definition of the image point as the intersection points and reversal points, image points may for example be defined as those points of the Lissajous figure that lie between adjacent intersection points or are passed on the Lissajous figure in a temporarily equidistant manner, or all points on the figure in the case of a continuous modulation of the light beam intensity.

For example, in FIG. 2 eight adjacent image points are shown at 42, each of which is illustrated as a rectangle bordering on the adjacent image points. The image points 42 are defined such that they are disposed at the positions along the Lissajous figure that lie between adjacent intersection points thereof. Each rectangle representing an image point comprises two opposing corners lying on the line of the Lissajous figure, while the other opposing corners substantially lie in the gap between adjacent lines of the Lissajous figure in a centered manner.

Although in FIG. 2 only eight image points 42 are shown for clarity, it is recognizable that an expansion of the such defined image points 42 to the remaining area of the image field 22 also yields an arrayed arrangement of image points that are substantially arranged by column and row, although they become more dense towards the outside. Differing from the projection methods described in the Background of the Invention section, the image points 42 arranged in an arrayed manner, however, are not passed by row by the light point 35 created by the deflected laser beam 18'. Rather, for example the left upper image point and the lower right image point next to it are successively passed. As a result, in particular image points of other rows are passed even before all four image points of the upper row of the eight image points 42 are passed.

It is to be noted that the deflection and/or the deflected laser beam 18' refers to an orientation of the deflection means 12 corresponding to a certain scanning point. In general, the laser beam 18 will not be turned on permanently, so that a path the laser beam 18 describes in the scan represents a broken line.

After the deflection of the light beam 18 by the deflection means 12 as well as the predetermined and reproducible movement resulting therefrom of the light point created by the deflected light beam 18' on the image field 22 has been described previously, in the following the modulation of the intensity of the light beam 18 to create light points with desired brightness at the image points is described.

FIG. 3 shows an example for a binary modulation of an exemplary laser. On the left-hand side in FIG. 3, there is given an example for an image having 16 pixels, which are white except for a pixel A and a pixel B. The pixel A has a lighter gray scale and the pixel B a darker gray scale. The deflected light beam 18' passes, along the scan, at first the pixel A in the time interval beginning at the first time instant $T_1$ and ending at a second time instant $T_2$, and sweeps the pixel B in a second time interval beginning at the second time instant $T_2$ and ending at a third time instant $T_3$.

An inventive modulation of the laser is illustrated on the right-hand side of FIG. 3. In this embodiment, a laser is used as light beam 18, which has two states (on-state or off-state). The modulation on the right-hand side in FIG. 3 illustrates an intensity distribution of the laser depending on the time t. Prior to the first time instant $T_1$, the laser is in an on-state, so that the laser has a constant maximum intensity $i_{max}$. At the first time instant $T_1$, the laser is switched to the off-state. In the time interval $T_{pixel,A}$, in which the laser sweeps the pixel A and which begins at the first time instant $T_1$ and ends with the second time instant $T_2$, the laser is turned on for a first time interval, turn-on interval $t_{ON,1}$, it being arranged for example symmetrically around a center point of the first time interval $T_{pixel,A}=T_2-T_1$. Thus, at the second time instant $T_2$, the laser is in the off-state and is turned on for some time in the second time interval $T_{pixel,B}=T_3-T_2$, which extends from the second time instant $T_2$ to the third time instant $T_3$, wherein for example the second turn-on interval $t_{ON,2}$ extends symmetrically around a second time instant $t_2$. Hence, the laser is turned off at the third time instant $T_3$ and is turned on again from this time instant onwards. The first turn-on interval $t_{ON,1}$ and the second turn-on interval $t_{ON,2}$ here advantageously are chosen such that the corresponding brightness of the image point belonging to the pixel A and to the pixel B is reached. Since the pixel A is brighter than the pixel B, the first turn-on interval $t_{ON,1}$ hence also is longer than the second turn-on interval $t_{ON,2}$, as illustrated on the right-hand side of FIG. 3. The time instants $t_1$ and $t_2$ may here for example be chosen such that they are each located in the middle of the time interval the laser needs for sweeping the respective pixel. This means that for example $t_1=(T_2+T_1)/2$ and $t_2=(T_3+T_2)/2$, respectively, but may also be chosen differently. Likewise, $T_{pixel,A}$ generally do not match $T_{pixel,A}$, i.e. the length the light beam needs for sweeping a pixel is position-dependent.

In further embodiments, the binary modulation method may also be modified in that the turn-on phase $t_{ON}$ in the time interval $T_{pixel}$ may have a multiplicity of turn-on phases so that the laser is not turned on continuously. For example, a pulsed laser with a very high pulse frequency may be employed to this end.

Figure 4:
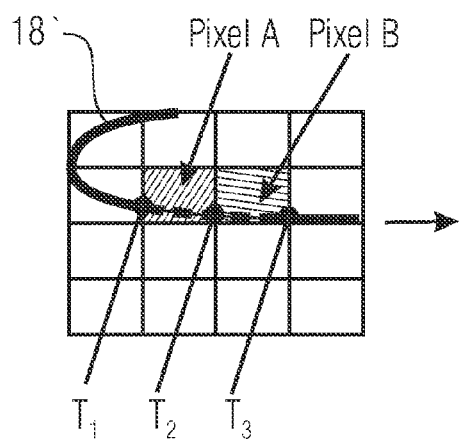
FIGS. 4A to 4D show a modulation by means of combination methods according to embodiments.
Figure 4:
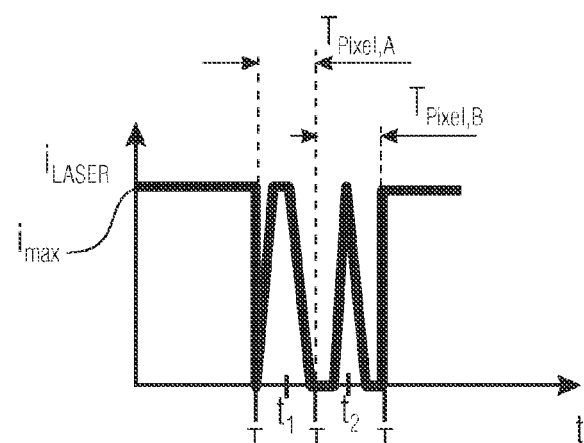
Figure 4:
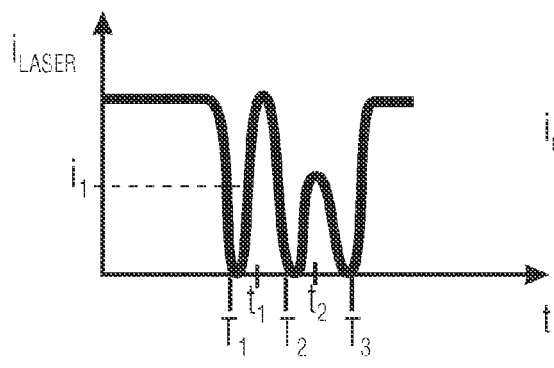
Figure 4:
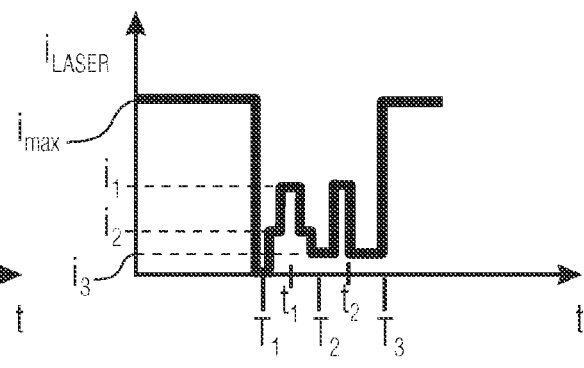

FIG. 4 shows further embodiments, in which the binary modulation method, which was described in FIG. 3, is combined with conventional brightness modulation (amplitude modulation of an exemplary laser beam). FIG. 4a shows, like FIG. 3, an example for an image consisting of 16 pixels, in which all pixels are white except for the pixel A and the pixel B, and the deflected laser beam 18' at first sweeps the pixel A and then the pixel B. The first time instant $T_1$ here again, just like the second time instant $T_2$ and the third time instant $T_3$, is chosen such that they again mark edge points of the pixel A and of the pixel B.

FIG. 4b shows a modulation of the exemplary data, wherein the laser is again turned off at the first time instant $T_1$, and an on-state in the first time interval $T_{pixel,A}$ is not reached instantaneously, but the intensity slowly increases during a turn-on phase. Like in the embodiment of FIG. 3, here also a maximum of the intensity $i_{max}$ is reached at a time instant $t_1$ within the first time interval $T_{pixel,A}$, which is limited by the edge points $T_2$ and $T_1$. This maximum may for example again be chosen in the middle of the first time interval $T_{pixel,A}$. Likewise, in the second time interval $T_{pixel,B}$, which is limited by the third time instant $T_3$ and the second time instant $T_2$ and which corresponds to the time interval the deflected laser beam 18' needs for sweeping the pixel B, the on-state is not reached instantaneously, but again through a slow rise of the amplitude. The maximum value is again reached at the time instant $t_2$, which for example lies in the middle of the second time interval $T_{pixel,B}$. The turn-off also does not have to take place instantaneously, but may extend over a certain turn-off interval.

FIG. 4c shows a modulation of the laser, wherein the intensity of the laser changes continuously. This means that, not as shown in FIG. 4b, the intensity of the laser at the first time instant $T_1$ does not change suddenly (from $i=i_{max}$ to $i=0$), but that the intensity of the laser in a turn-off phase changes continuously from the maximum value $i=i_{max}$ to $i=0$. This behavior may be expressed mathematically such that the intensity describes a steadily differentiable curve in time. In this sense, the intensity curve in FIG. 4c is a smoothened illustration of the intensity curve of FIG. 4b. Thus, a minimum of the intensity is reached again at the first time instant $T_1$, but not abruptly like in FIG. 4b, and a minimum is also reached at the second time instant $T_2$, wherein a maximum of the intensity curve is reached again in the time interval lying therebetween. In similar manner, a minimum of the intensity curve is also reached at the third time instant $T_3$, wherein between the third time instant $T_3$ and the second time instant $T_2$ again a maximum of the intensity curve $i_1$ is reached. In contrast to the embodiment of FIG. 4b, the maximum $i_1$ in the second time interval $T_{pixel,B}$, however, is smaller than $i_{max}$, which is reached at the time instant $t_2$ in the second time interval $T_{pixel,B}$, in the embodiment of FIG. 4b. Thus, like in the embodiment before, minima in the intensity distribution are at the edges of the time interval $T_{pixel}$, and maxima for example are in the middle of the time intervals $T_{pixel}$. It is to be pointed out that for the case if the pixel corresponds to a black point, the laser remains in the off state, so that no maximum exists between the edges of the time interval $T_{pixel}$. The steady behavior during the change in the intensity of the laser, such as shown in the embodiment of FIG. 4c, is particularly advantageous in that the laser is not operated at maximum intensity for each time interval $T_{pixel}$, whereby the stress of the laser decreases.

FIG. 4d shows an embodiment in which the intensity of the laser is changed in discrete steps. In this embodiment, the laser for example comprises discrete values of intensity steps $i=(i_{max},i_1,i_2,i_3,0)$, wherein $i_{max}>i_1,>i_2>i_3>0$ applies. At the first time instant $T_1$, at which the laser in the off state, the intensity of the laser radiation at first is increased to the value $i_2$, and then from the value $i_2$ to the value $i_1$ in a second step. Before the laser reaches the intensity $i_3$ at the second time instant $t_2$, the intensity $i_1$ is as first again reduced to the value $i_2$, and reduced from the intermediate value $i_2$ to the value $i_3$ in a second step. During the second time interval $T_{pixel,B}$, the intensity of the laser is increased from the value $i_3$ to the value $i_1$, and again reduced to the value $i_3$ at a later time instant. At the time instant $T_3$, the intensity of the laser is again increased to the maximum value $i_{max}$.

Like in the embodiment of FIG. 4c, this embodiment also is advantageous in that the intensity of the laser does not suddenly jump between extreme values (on/off), but that, as far as possible by the image data, the laser is operated at reduced power. But here also minima in the intensity are reached at the time instants when a pixel change takes place.

The areas below the intensity curves from FIGS. 3, 4b, 4c and 4d here correspond to the gray scale of the corresponding pixels. If the laser has the maximum intensity $i_{max}$ during the entire time interval $T_{pixel}$, the corresponding pixel point has the highest brightness possible. The area within the first time interval $T_{pixel,A}$ below the intensity curve is larger for all three curves than the area below the intensity curve during the second time interval $T_{pixel,B}$. This means that the pixel A, which is swept during the first time interval $T_{pixel,A}$, has higher brightness than the pixel B, which is swept by the laser during the second time interval $T_{pixel,B}$. Advantageously, in all embodiments shown in FIGS. 3, 4b-4d, a maximum intensity each is reached in an inner time instant, i.e. at a time instant $t_1$ during the first time interval $T_{pixel,A}$ and at a second time instant $t_2$ during the second time interval $T_{pixel,B}$, wherein $t_1$ and $t_2$ lie within two reversal points advantageously having a distance to the respective edge points of the time interval, since there are advantageously local minima of the intensity at the edge points. At this point, it also is to be mentioned that, as shown in FIG. 4c, the transition from the previous pixel to the pixel A cannot take place instantaneously, but that the laser switches from the value of maximum intensity $i_{max}$ to a value of minimum intensity at the first time instant $T_1$ in a certain turn-off phase. Likewise, the turn-on phase at the third time instant $T_3$ may have a certain temporal duration in which the laser beam 18' goes back to the state of maximum intensity $i_{max}$ from minimum intensity.

In general, there result several possibilities of how an amount of light corresponding to the brightness of an image point can be projected. On the one hand, using a look-up table, a pattern for the intensity distribution may be assigned to each brightness value. On the other hand, the pattern of the intensity distribution may also be determined (e.g. only with the assignment of a maximum intensity to a brightness value). For the discrete intensity steps $i_n$ ($n=1, 2, 3, ...$) from FIG. 4c, this would mean that a certain intensity step $i_n$ and a turn-on duration $t_{ON,pixel}$ is indicated for each brightness value. Alternatively, for each brightness value, a minimum intensity step $i_m$ can be calculated, and then a necessary turn-on duration $t_{ON,pixel}$ needed for reaching the brightness value is determined. The minimum intensity step $i_m$, for example, would be the intensity step needed to reach the brightness of the image point within the time duration $T_{pixel}$, i.e. the next lower intensity step $i_{m-1}$ would not be able to provide the brightness of the image point during the time interval $T_{pixel}$ even if the laser was permanently turned on. In further embodiments, combinations may also be used, for example an assignment (by table) of the turn-on time $t_{ON,pixel}$, and a calculation of an intensity value, or other variations.

Figure 5:
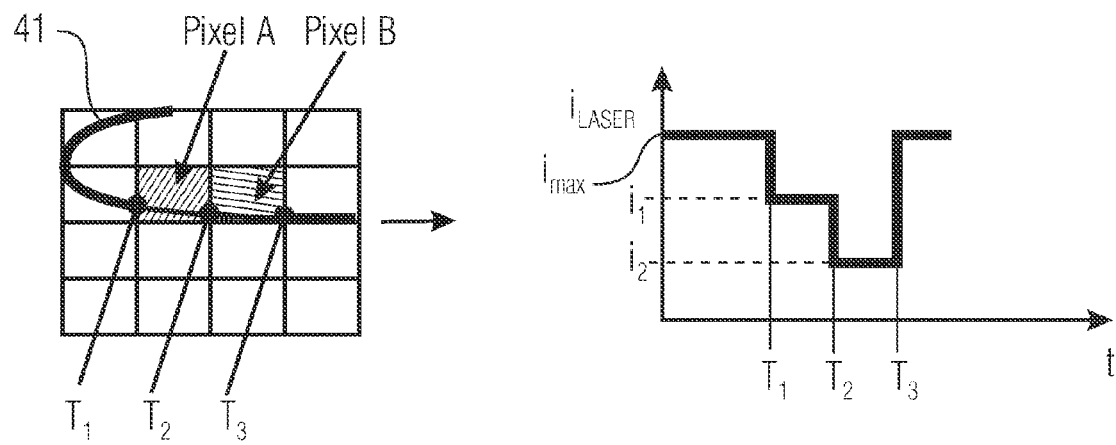
FIG. 5 shows a conventional brightness modulation.
Figure 6:
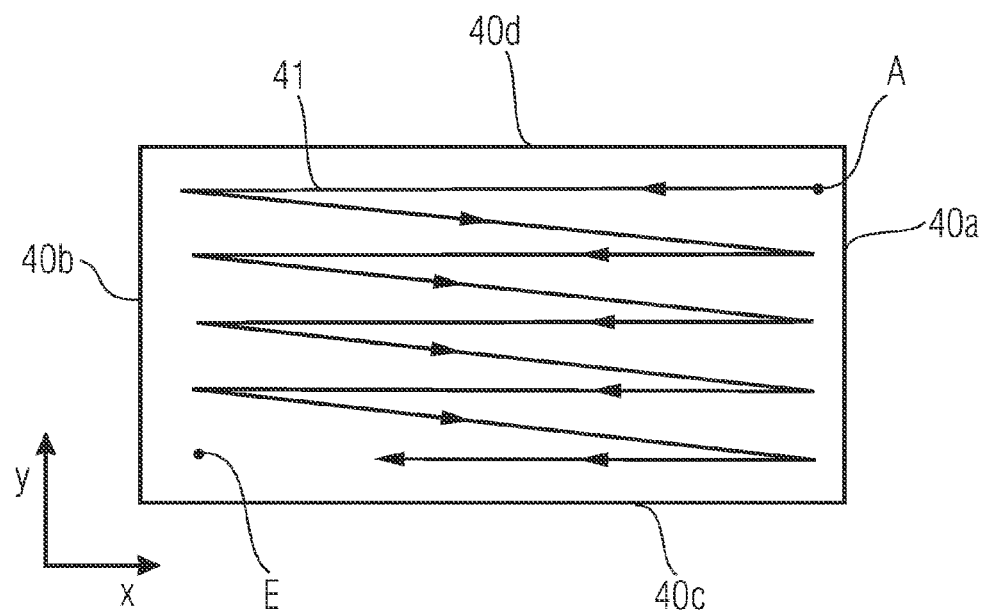
FIG. 6 shows a predetermined course the light beam describes in a linear scan.

All embodiments shown further have in common that the intensity and/or the brightness with which the laser beam 18' changes at least twice during the time interval $T_{pixel}$ in which a given pixel is swept. As compared with conventional modulation methods, thereby a changed distribution for the intensity of the laser results. The following distributions result for the frequency with which an intensity $i\epsilon[0,i_{max}]$ occurs during a time interval $T_{pixel}$. In the embodiment of FIG. 3, two brightnesses frequently occur in the modulation. On the one hand, these are the maximum intensity $i_{max}$ and a negligible intensity $i=0$ or intensity in the turned-off state (for example at the second time instant $T_2$). Thus, the corresponding frequency distribution of the intensity has two pronounced maxima (a so-called bimodal distribution), one maximum at $i=0$ and a second maximum $i=i_{max}$. For the case that the laser works with maximum intensity $i_{max}$ for a certain time interval and is turned off for a further time interval (so that $i=0$ applies) in the embodiment of FIG. 4b, the frequency distribution of the intensity again shows a maximum at $i=0$ and at $i=i_{max}$. The concrete shape of the frequency distribution here depends on how long the laser remains in the turned-on state at $i=i_{max}$ and how long the laser remains in the turned-off state $i=0$. The linear rise of the intensity in FIG. 4b corresponds to a constant portion in the frequency distribution. In an embodiment of FIG. 4c, it is similar to the embodiment of FIG. 4b, but with the difference that the portions with constant behavior of the frequencies are changed. For the second time interval $T_{pixel,B}$, in which the pixel B is represented, $i_{max}$ does not, however, occur as a maximum, but instead $i=i_1<i_{max}$. The embodiment of FIG. 4d, however, in which the frequency distribution of the intensity has additional maxima between the values $i=0$ and $i=i_{max}$ (a so-called polymodal distribution), shows a behavior different in quality. These maxima here correspond to the discrete steps, i.e. the first intensity $i_1$, the second intensity $i_2$ and the third intensity $i_3$, wherein the height of the maxima in the frequency distribution is determined by the dwelling time of the laser in the respective intermediate states. In contrast thereto, in the modulation according to conventional technology, as shown in FIG. 5, the frequency distribution for a pixel only has one sharply pronounced maximum each. The respective maximum here corresponds to the values $i_1$ and $i_2$ and has a δ-function behavior in the ideal case.

In summary, aspects of the present invention may be described as follows. A scanning laser projection method uses a light signal modulated temporally in the intensity for representation of the pixel brightness during the time in which the laser sweeps a pixel. A corresponding laser projection system or a projection apparatus uses a laser that is not constantly modulated so that the pixel energy to be radiated of the image point is reached integrally, during the sweep of a pixel. Furthermore, a corresponding laser projection system is modulated binarily (on/off) in time in laser intensity within one pixel. Moreover, in a corresponding laser projection system, the laser intensity may be modulated in time within one pixel with more than two steps. The corresponding laser projection system may be employed for a monochrome or multi-color (multi-laser) projection or also in desktop projectors, business projectors, mobile telephones, laptops, PDAs (personal digital assistants), home cinema, cinema, industrial application, strip projection, etc. Directly modulatable lasers or also so-called cw (continuous wave) lasers with an external modulation may be used here. Moreover, projection may be onto any surfaces or also on special screens.

Although the image representation using a resonant scan method (by means of Lissajous figures, for example) offers some advantages, an inventive modulation is, however, likewise applicable to any other scan method, particularly also to the linear scan method. Moreover, other light sources may be employed, as long as intensity modulation is possible, e.g. light generated by semiconductor layer structures (inorganic or organic), phosphorescence, etc.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A projection apparatus for scanningly projecting an image onto an image field by means of a radiation beam, comprising:
a modulator for modulating an intensity of the radiation beam such that the radiation beam transfers within a time interval during which the radiation beam sweeps a pixel of the image field, an amount of light corresponding to a brightness of the pixel of the image field, and such that the intensity of the radiation beam changes at two or more sequential time instances during the time interval so as to assume more than two different discrete intensity values in partial time intervals into which the time interval is sub-divided by the time instances so that a frequency distribution of the intensity of the radiation beam during the time interval is polymodal.

2. The projection apparatus according to claim 1, wherein the modulator is formed such that a temporal derivative of the intensity of the radiation beam comprises a local maximum within the time interval.

3. The projection apparatus according to claim 1, wherein the modulator is formed such that the intensity of the radiation beam changes in a further time interval during which the radiation beam sweeps a further pixel of the image field, wherein the time interval is different from the further time interval.

4. The projection apparatus according to claim 1, wherein the modulator is formed such that the intensity comprises two reversal points within the time interval as a function of time.

5. The projection apparatus according to claim 4, wherein the time interval comprises a beginning and an end, at which the radiation beam enters and exits the pixel, and wherein the intensity comprises local minima at the beginning and the end.

6. The projection apparatus according to claim 1, further comprising a deflection device for deflecting a radiation beam about a first deflection axis and a second deflection axis to move the radiation beam across the image field.

7. The projection apparatus according to claim 1, wherein the modulator is formed to continuously change the intensity of the radiation beam in the time interval.

8. The projection apparatus according to claim 1, wherein the modulator is formed to change the intensity of the radiation beam in two or more steps in the time interval.

9. The projection apparatus according to claim 8, wherein the modulator is formed to adjust the intensity of the radiation beam to a maximum value or a minimum value, wherein a turn-on duration during which the intensity comprises the maximum value is chosen so that the radiation beam transfers an amount of light corresponding to a brightness of an image point.

10. The projection apparatus according to claim 8, wherein the modulator is formed to adjust the intensity of the radiation beam to a multiplicity of discrete values, and wherein the modulator is further formed to choose, from a lookup table for a brightness of an image point, a certain discrete value and a corresponding turn-on duration during which the intensity comprises the certain discrete value.

11. The projection apparatus according to claim 8, wherein the modulator is formed to adjust the intensity of the radiation beam to a multiplicity of discrete values, and wherein the modulator is further formed to calculate, from a brightness of an image point, a certain discrete value and/or a corresponding turn-on duration during which the intensity comprises the certain discrete values.

12. The projection apparatus according to claim 1, further comprising a laser for generating the radiation beam.

13. The projection apparatus according to claim 12, wherein the laser is a pulsed laser.

14. The projection apparatus according to claim 12, wherein the laser is a continuous-wave laser with external modulation.

15. The projection according to claim 12, wherein the laser is a directly modulatable laser.

16. The projection apparatus according to claim 1, further comprising a light source for generating the radiation beam and a further light source for generating a further radiation beam, wherein the modulator is formed also to modulate the further radiation beam, and the further radiation beam differs from the radiation beam by its spectrum, and wherein the radiation beam and the further radiation beam are capable from being projected onto the image field.

17. The projection apparatus according to claim 1, further comprising a light source for generating the radiation beam.

18. The projection apparatus according to claim 6, wherein the deflector is formed such that the radiation beam is deflectable about the first deflection axis at a first deflection frequency and about the second deflection axis at a second deflection frequency, wherein the deflector comprises means adjusting the frequency ratio to $f_1:f_2=n:m$, with m and n being different integers, so that the radiation beam describes a Lissajous figure on the image field.

19. The projection apparatus according to claim 1, wherein the modulator is configured such that an intensity value which the intensity of the radiation beam assumes in a last one of the partial time intervals, extending from a last one of the time instances to the end of the time interval, is not equal to zero.

20. The projection apparatus according to claim 19, wherein the modulator is configured such that an intensity value which the intensity of the radiation beam assumes in a first one of the partial time intervals, extending from the beginning of the time interval to a first one of the time instances, is zero.

21. The projection apparatus according to claim 20, wherein the modulator is configured such that an intensity value which the intensity of the radiation beam assumes in a middle one of the partial time intervals lying between the first and last partial time interval, is greater than the intensity value which the intensity of the radiation beam assumes in the last partial time interval.

* * * * *